United States Patent [19]
Woods et al.

[11] B  3,982,067
[45] Sept. 21, 1976

[54] TELEVISION SIGNAL AMPLIFIER APPARATUS FOR COUNTERACTING EFFECTS OF UNWANTED SIGNAL COMPONENTS

[75] Inventors: Eric R. Woods; Russell G. Thompson, both of San Diego, Calif.

[73] Assignee: General Dynamics Corporation, San Diego, Calif.

[22] Filed: Nov. 1, 1974

[21] Appl. No.: 519,979

[44] Published under the second Trial Voluntary Protest Program on February 3, 1976 as document No. B 519,979.

[52] U.S. Cl. ............................ 178/7.1; 178/DIG. 12; 178/DIG. 30
[51] Int. Cl.² ........................................... H04N 3/16
[58] Field of Search .............. 178/DIG. 12, DIG. 30, 178/7.3 DC, 7.5 DC, 7.3 R, 7.5 R, 7.1

[56] References Cited
UNITED STATES PATENTS

| | | |
|---|---|---|
| 2,829,247 | 4/1958 | Thomas ...................... 178/DIG. 12 |
| 3,735,035 | 5/1973 | Kowalski et al. ............ 178/DIG. 12 |
| 3,812,289 | 5/1974 | Avins .............................. 178/7.3 R |

Primary Examiner—Albert J. Mayer
Attorney, Agent, or Firm—Martin LuKacher, Esq.

[57] ABSTRACT

Television signal amplifier apparatus is described which protects undesirable impairment of the television signal. The apparatus includes a video signal amplifier. High speed switching devices are operative to control the gain of the amplifier as well as the amplifier output. These high speed switching devices are operated by fast acting signal level detectors and a fast acting sync signal detector, such that any signals above certain levels in the white and black regions of the television signal are suppressed even if of very short duration. The synchronizing signal detector operates to reduce the gain of the amplifier to less than unity, thus suppressing oscillation modes established in the video signal transmission path caused by looping the output to the input, as may occur in the course of television signal handling operations.

10 Claims, 2 Drawing Figures

U.S. Patent  Sept. 21, 1976  3,982,067
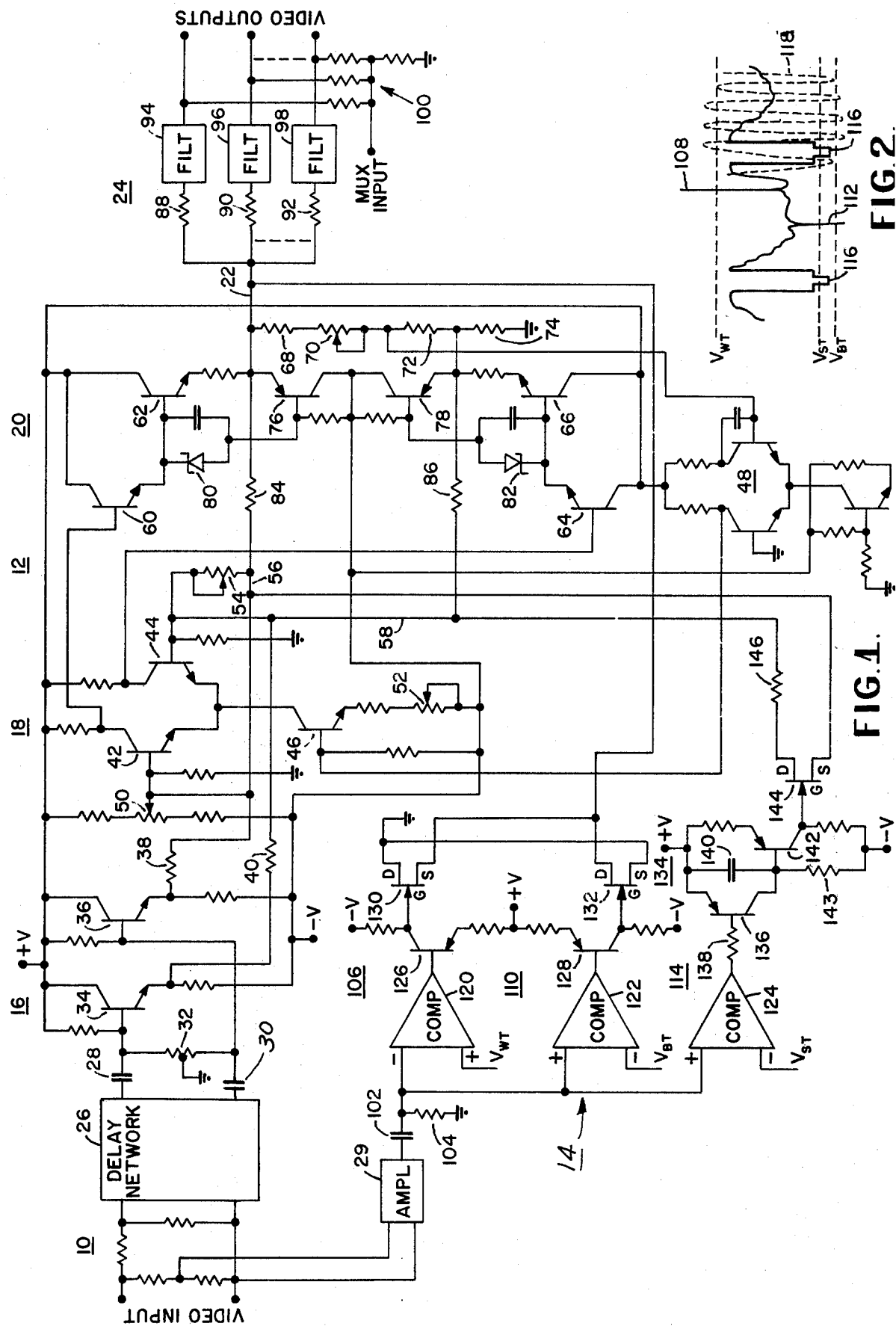

TELEVISION SIGNAL AMPLIFIER APPARATUS FOR COUNTERACTING EFFECTS OF UNWANTED SIGNAL COMPONENTS

The present invention relates to television signal amplifiers apparatus and particularly to apparatus for suppressing the effects of signal transmission and switching devices upon television signals.

The present invention is especially suitable for use in television studio equipment and provides means for counteracting adverse effects incidental to the operation of signal handling, processing and switching apparatus found in television studios and broadcasting stations upon the quality of the television signal.

Television signals are often subject to considerable signal processing and routing in television studios, broadcast stations, and even between stations of a television broadcast network. Typically, television signals are video recorded and played back. Also several channels each with different television signals may be handled by transmission and switching systems so as to route various television programs in the network as well as within the studio, and select the desired channel for transmission. For example, several channels may be available, say from different cameras, video recorders or kinescope chains. Video signal processing and routing systems then are used for the transmission and selection of the desired television signal which may then be sent over the network or transmitted over the air. Reference may be had to U.S. Pat. No. 3,840,702 issued Oct. 8, 1974 to Eric R. Woods, for further information respecting such video signal processing and routing systems.

Examples of the effects on the television signals which result from such video signal processing and routing system are:

a. Impulse noise, such as noise spikes—These may be positive or negative-going spikes which extend above levels which can produce saturated white or black conditions in the picture resulting from the television signal. These noise spikes can be produced by scratches on video tape records, scratches on film reproduced on kinescope devices, and even from electrical interference effects.

b. Oscillations which can even replace the television signal — This may occur by an inadvertent closing of a loop in the video signal processing and routing system upon itself. For example, a video tape recorder may be placed in a standby mode and continue to operate. A studio monitor may inadvertently connect a load point to a signal source. The oscillation frequency depends upon the transfer characteristics of the loop. In the event that the oscillations are of high level and extend into the black or white regions of the television signal the entire system may be saturated.

c. High level noise of the impulse variety or as white noise — This may result, for example upon a complete loss of a channel such as a recorder or a microwave link. The channel then operates open ended, producing high level noise.

Unless the noise is suppressed, whether it be noise spikes or high level noise, various adverse and undesirable visual effects are manifested in pictures generated from the television signal. These may include shifts in the picture level or intensity as well as synchronization errors. Oscillations, as discussed in subparagraph (b) also produce undesirable visual effects which can be of a long-term nature if the oscillations are of sufficiently high level to saturate the system.

It is necessary that these adverse effects which impair the television signal be suppressed without otherwise impairing the television signal, or the signal processing and routing systems which handle the television signal. For example, a saturation condition could introduce severe gain compression in a television signal channel. Such gain compression can manifest itself in a manner more undesirable than the noise and oscillation effects discussed above in that the effects of gain compression of a long term duration can not only distort the television signal but can cause loss of other signals which may be multiplexed therewith. For example, audio or digital data may be multiplexed with the television signal and lost if the system gain is compressed. Such multiplexing of channels of audio or data with television signals is becoming more prevalent in use in television studios as programming increases in complexity. Reference may be had to the above-identified Woods patent for further information respecting multiplexed television signals.

Accordingly, it is an object of the present invention to provide improved television signal amplifier apparatus which suppresses picture impairment defects, such as may be the results of noise transients and oscillatory loads within television signal processing and routing systems, without adversely affecting the transmission of the television signal.

It is a further object of the present invention to provide improved television signal amplifier apparatus which suppresses picture impairment defects without imposing corrections, such as gain compression, which can cause loss of wanted signal or signal channels, such as may be multiplexed with the television signals.

It is a still further object of the present invention to provide television signal amplifier apparatus which may be used in association with other video signal processing and routing systems so as to eliminate the signal disturbances which may be incident to the operation of such other systems.

Briefly described, television signal amplifier apparatus embodying the invention includes a video signal amplifier which amplifies the television signal. This amplifier may be a multistage amplifier having input, intermediate and output driver stage. Signals at the input of the amplifier are applied to at least three detecting means. When the television signals at the input exceed a certain level in the white region, an output is provided from one of the detectors. Another of the detectors provides an output when signals exceed a certain level in the black region. Still another of the detectors detects the synchronizing signals of the television signal and provides an output on the absence thereof. Each of these detectors may be high speed devices including digital comparator circuits, and in the case of the synchronizing signal detector a pulse width discriminator circuit in addition to the comparator. Switching devices which are also operative at high speed, such as field effect transistors, are connected at the output of the amplifier and also in gain controlling relationship with the intermediate stage of the amplifier. When the high level signals in the white or black regions are detected, the switches at the amplifier output are operated. In this way the noise spikes discussed in subparagraph (a) above, as well as high level noise discussed in subparagraph (c) above may be suppressed without the necessity of gain compression and in the manner to preclude saturated operation in the amplifier. The switch in the amplifier intermediate stage is operated in a manner to reduce the gain of the amplifier or the gain of the loop in the system containing the amplifier below unity gain upon the absence of the synchronizing pulses. Oscillation of the type discussed in subparagraph (b) above is then precluded since continuous oscillatory modes are avoided by periodically reducing the loop gain such that such modes can not occur.

The foregoing and other objects and advantages of the invention will become more readily apparent from a reading of the following description in connection with the accompanying drawings in which:

FIG. 1 is a schematic diagram illustrating television signal amplifier apparatus embodying the invention; and FIG. 2 is a waveform diagram illustrating the television signal which may be handled in the apparatus as shown in FIG. 1.

Referring to FIG. 1, the television signal is applied to the apparatus input indicated as "video input". The signal there is divided by means of a voltage divider or resistor pad arrangement 10 and applied to a television signal amplifier 12 and to detectors 14. The amplifier 12 has an input stage 16, a differential gain intermediate stage 18, and an output driver stage 20. The output from the amplifier is taken from the driver stage at line 22 and is applied by way of an output network 24 to the outputs of the apparatus which are indicated by the legend video outputs. The apparatus which is contained between the video input and video output thereof may be connected in the video signal path of a television signal processing and routing system, as described in the above referenced Woods patent, so as to suppress the undesirable effects on the television signal which may result during the operation of such systems.

A delay network 26 is connected between the path 10 and the input of the amplifier first stage 16. This delay network may be constituted of a series of L-C filter sections. The network 26 delays the television signal by an amount commensurate to the delay thereof in the detectors 14. This prevents the introduction of undesired signals which might result from the operation of the detectors and their associated switches as will be more fully described hereinafter. In the event that the detectors 14 and the amplifier 12 are separated and interconnected by cables, the delay network 26 can provide such additional filter sections as to compensate for the delay in the cable as well as to equalize the cable such that its frequency response does not distort the television signal.

Another amplifier 29 which may be a video amplifier of the operational type is connected between the pad 10 and the input to the detector 14. This amplifier 29 is provided for signal level adjustment purposes and also desirably has a frequency response which is substantially the same as the frequency response of the television signal amplifier 12. Accordingly, any signals or signal components which are out of the television signal band are filtered by the amplifier 29 and prevented from actuating the detectors 14. The frequency response characteristics of the amplifier 29 and the delay network 26 has the additional advantage of providing filtering at the subcarrier frequency of the subcarriers which may carry channels, such as data and audio channels which accompany the television signal information and prevent such subcarriers from being transmitted through the amplifier 12 or the detectors 14. The subcarriers may be combined with the television signals in the output network 24.

The input or first stage 16 of the amplifier 12 is a dual transistor emitter follower stage. The signals from the delay network are applied via the capacitors 28 and 30 and the resistor 32, the center tap of which is grounded, to the bases of a pair of transistor amplifiers 34 and 36 which are connected in emitter follower configuration. Resistors 38 and 40 which are connected to the emitters of the transistor amplifier 34 and 36 of the input stage 16 are connected to the bases of a pair of transistors 42 and 44 of the intermediate stage 18. The transistors 42 and 44 are connected as a differential amplifier. The emitters of the transistors 42 and 44 are connected together and to the negative voltage side (indicated at −V) of the operating voltage supply by way of a transistor 46. This transistor 46 receives a feedback voltage from another differential amplifier 48 in the output driver stage 20 of the amplifier 12.

DC balance of the differential amplifier 18 is obtained by a potentiometer arrangement 50 connected between the operating voltage supplies at +V and −V. The dynamic balance of the signal is adjusted by controlling the feedback from the output driver stage 20 via differential amplifier 48, to the transistor 46. This feedback by way of the differential amplifier 48 and transistor 46 controls the zero point dynamically. The static adjustment of the direct current zero point is provided by a potentiometer 52 which is connected in the emitter path of the transistor 46. The gain of the amplifier 12 is manually adjustable by a potentiometer 54 which is connected between the bases of the transistors 42 and 44. Leads 56 and 58 provide for feedback from the output stage 20 to the intermediate stage as well as for gain reduction for the suppression of adverse effects on the television signal as will be discussed more fully hereinafter.

The output driver stage 20 is provided by a balanced amplifier. Each side of the amplifier includes a pair of current amplifier transistors 60, 62 and 64, 66, the outputs of which are combined across three series connected resistors 68, 70 and 72. A resistor 74, which is connected to ground, dummy loads one of the output sides of the amplifier 20. The other side of the amplifier 20 is connected by way of the lead 22 to the output network 24.

Bias levels for the current amplifiers 60, 62, 64 and 66 are set by transistors 76 and 78, the bases of which are connected to zener diode networks 80 and 82.

Feedback is provided to the intermediate stage 18 from the output of the amplifier by way of resistors 84 and 86. These resistors are connected to the leads 56 and 58, and thus feed back current to the bases of the transistors 42 and 44. Additional feedback for the dynamic stabilization of the amplifier is obtained across the resistors 72 and 74 by the connection of the resistor 72 to the base of one of the transistors in the differential amplifier 48. The resistor 70 is a potentiometer which affords fine adjustment of the current which determines the dynamic balance feedback voltage which is applied to the differential amplifier 48.

The output stage includes a plurality of output resistors 88, 90 and 92, each for a different video output. Each resistor is connected in series with a filter 94, 96 and 98 which serves to pass the television signal band but suppress the bands of the multiplexed channels. These channels may be applied from an auxiliary multiplex input (labeled "MUX Input"). A resistor combining network 100 connected to the video output serves to combine the television signal with the multiplexed channels such that a composite signal will be available at each of the video outputs. The dash lines in the output network indicate that additional channels, each including a resistor and filter may be provided. Of course, if only one channel is needed, only one filter and resistor branch may be provided in the output network 24.

The input signals after amplification in the amplifier 29 are coupled to the detectors 14 through a coupling capacitor 102 and across a shunt resistor 104. Three detector circuits are provided. A first detector circuit 106 responds to levels such as noise peaks 108 (FIG. 2) which exceed a threshold level $V_{WT}$ which denotes a certain level in the white region of the television signal. By white region is meant that region which will produce a brightening of the screen. It may not necessarily be white for screen phospors of different color, as for example the dots which constitute one of the colors of a color cathode ray tube screen. The term white, however, is used in the conventional sense to indicate signal components of one polarity which in a conventional television signal, such as shown in FIG. 2, is the positive polarity.

The detectors 14 include another detector 110 which responds to signals such as noise spikes 112 (FIG. 2) which exceed a certain level, indicated as $V_{BT}$ in the black region of the signal.

A third detector 114 is a fast-acting synchronizing signal detector and detects the occurrence of synchronizing signal pulses (116, FIG. 2) which have absolute values higher than a certain level indicated as $V_{ST}$. The detection of the synchronizing signals is operative to reduce the gain of the amplifier 12, particularly by reducing the gain in its intermediate differential amplifier stage 18 thereof. Such reduction in gain suppresses oscillation such as indicated by the dash lines 118 in FIG. 2.

It will be observed that absent the suppression of the noise peaks and oscillation modes, a saturation condition of the television signal may result. In such event the signal will be impaired and the picture produced from the signal will be visually defective as explained above. All of the detectors 106, 110 and 114 are fast acting so as to suppress the signals even though they occur very rapidly as impulses. To this end, the detectors each have a comparator circuit 120, 122 and 124. These comparator circuits are of the type used in digital or computer logic and provide a negative level when the inputs thereto are equal in amplitude and of the same polarity. For example, the comparator 120 has as one of its inputs a positive threshold level $V_{WT}$ which is applied to the positive or direct input thereof. The amplifier input signal which is obtained from the amplifier 29 by way of a coupling capacitor 102 is applied to the negative or inverting input of the comparator. In order for the comparator to provide an output, the inverting input must be positive and of a magnitude equal or exceeding the magnitude of the reference voltage $V_{WT}$. Accordingly, any positive noise spikes such as the spike 108 (FIG. 2) which enter the white region of the television signal result in an output level from the comparator 120. The comparator 122 similarly has a reference level equal to $V_{BT}$ (a negative voltage) applied to its negative or inverting input, while the input signals are applied to its direct or positive input. The comparator 122 then provides an output for such negative peaks as illustrated by the noise peak 112 in FIG. 2. The comparator 124 similarly operates and detects the peaks of the synchronizing pulses 116 which are more negative than $V_{ST}$.

Driver amplifiers 126 and 128 are connected to the output of the comparators 120 and 122. These driver amplifiers are single stage transistor amplifiers which provide output voltages of sufficient magnitude to drive field effect transistor switches 130 and 132. The collectors of the amplifiers 126 and 128 are respectively connected to the gate electrodes of the field effect transistors 130 and 132. These field effect transistors are connected oppositely polarized (i.e. source, high but drain grounded for the transistor 130 and drain high but source grounded for the transistor 132), since the pulses of different polarity are to be switched through the transistors 130 and 132, across the output of the output stage 20 of the amplifier 122. This connection is made to the output lead 22 from the amplifier 12. Accordingly, when the comparator 120 provides an output level the transistor 126 will be rendered conductive and switcch the voltage at the gate of the field effect transistor 130 from a negative voltage, which normally biases that transistor to cut off, to a positive voltage which causes the transistor 130 to become conductive and to shunt the noise spikes of a positive polarity to ground. The field effect transistor 132 is operated by the comparator 122 and driver transistor 128, in a manner similar to the transistor 130 and shunts negative peaks, such as the noise pulse 112 to ground.

The synchronizing signal detector 114 includes a pulse width detector circuit 134 consisting of a transistor 136, an input resistor 138, and a capacitor 140, which is connected between the emitter and collector of the transistor 136. Operating voltage is provided between the supplies indicated at +V and −V which are connected to the emitter and to the collector of the transistor 136, the latter connection being by way of a resistor 143.

The circuit 134 operates as a pulse width and frequency discriminator since pulses which are not of sufficient duration or frequency of the synchronizing pulse 116 will not maintain a sufficient charge on capacitor 140 through the collector-emitter path of the transistor 136. In such event that the pulse is not of sufficient duration or frequency, the transistor 142 is caused to conduct and drive a field effect transistor 144 into conduction. The drain of that transistor 144 is connected by way of resistor 146 to the lead 58. The source of the transistor 144 is connected to the lead 56. Accordingly, when the transistor 144 is rendered conductive the gain of the intermediate stage 18 of the amplifier will be determined principally by the value of the resistor 146. The value of this resistor 146 is selected so as to reduce the gain of the amplifier 12 and of any loop, which may include the amplifier in the video signal processing and routing system, to less than unity gain. Accordingly, oscillation modes which may result are suppressed an in the event that a television signal channel is lost or a source inadvertently connected to a load, the amplifier apparatus shown in FIG. 1 will prevent the interposition of a loop having a gain in excess of unity and thus will prevent oscillation to take place which might distort and adversely affect the televisiion signal.

From the foregoing description, it will be apparent that there has been provided an improved television signal amplifier apparatus which is operative to suppress noise peaks, oscillation and other undesirable signal effects, While an exemplary system and apparatus utilizing the invention has been described, it will be appreciated that variations and modifications thereof within the scope of the invention will undoubtedly suggest themselves to those skilled in the art. Accordingly, the foregoing description should be taken merely as illustrative and not in any limiting sense.

What is claimed is:

1. Television signal amplifier apparatus for counteracting the effects of unwanted signal components which can be introduced in the course of routing and processing of television signals having portions representing black and white picture regions and synchronizing signals, said apparatus comprising
    a. video signal amplifier means for amplifying said television signals, said amplifier means having an input and an output,
    b. first means responsive to said television signals at said input for detecting when said television signals represent the white region and are greater in absolute value than the value corresponding to a certain signal level in said white region,
    c. second means responsive to said television signals at said input for detecting when said television signals represent the black region and are greater in absolute value than the value corresponding to a certain signal level in said black region,
    d. third means responsive to said television signals at said input for detecting the occurrence of said synchronizing signals thereof,
    e. switching means connected at said output operated by said first and second means for preventing the transmission of signals at said output when said signal levels are greater either than said certain signal level in said white region or said certain signal level in said black region, and
    f. means operated by said third means for reducing the gain of said amplifier means such that said gain does not exceed unity gain during the absence of said synchronizing signals.

2. The invention as set forth in claim 1 further comprising means at said amplifier means input for delaying said television signal for an interval commensurate with the delay presented to said television signal in said first, second and third detecting means.

3. The invention as set forth in claim 2 wherein second amplifier means are provided for amplifying signals applied from said input to said first, second and third detecting means, said second amplifier means having a frequency response characteristic which is substantially the same as said frequency response characteristic of said video signal amplifier means.

4. The invention as set forth in claim 1 further comprising an output network connected to said amplifier output, said output network including at least one resistor and a filter connected serially therewith, said filter having a frequency response characteristic which extends to the upper end of the frequency band of said video television signal and cuts off above said upper end, and means for additively combining channels of multiplexed signals having frequencies above said upper end, said combining means including a resistor network connected to the output of said filter.

5. The invention as set forth in claim 1 wherein said video signal amplifier means comprises a plurality of amplifier stages at least one of which drives another stage, said other stage and said last-named stage having feedbacck connections therebetween, said gain reducing means including switching means connected to said feed back connection for reducing the gain of said stages.

6. The invention as set forth in claim 5 wherein said one stage is a differential amplifier stage having a pair of inputs, and said other stage being an output driver stage, said feedback connection being to said pair of inputs, said switch means being connected between said pair of inputs.

7. The invention as set forth in claim 6 wherein said switch means is a field effect transistor having its source and drain respectively connected to different ones of said pair of inputs, and its gate connected to said third detecting means output.

8. The invention as set forth in claim 1 wherein each of said detecting means includes a comparator which provides an output which is a certain voltage level when the amplitude of one input thereto is of the same polarity and exceeds the magnitude of a reference input thereto, and a driver circuit for translating said comparator output into operating levels for the one of said switch and gain reducing means connected thereto.

9. The invention as set forth in claim 8 wherein said driver means in said third detecting means includes a sync pulse detector circuit.

10. The invention as set forth in claim 9 wherein said switching means and said gain reducing means each includes a separate field effect transistor having its gate connected to the output of the one of said driver circuits therefor, the source and drain electrodes of said field effect transistors in said switching means being connected across said amplifier means output, the source and drain electrodes of said field effect transistor in said gain adjusting means being connected in shunt with a signal path in said amplifier, means for normally biasing said field effect transistors to their non-conductive condition so long as the output level from the comparator of the detecting means associated therewith is absent.

* * * * *